United States Patent [19]

Shiraishi

[11] Patent Number: 5,461,418
[45] Date of Patent: Oct. 24, 1995

[54] COLOR IMAGE PICKUP APPARATUS PROVIDED WITH A DIFFRACTION TYPE LOW-PASS FILTER

[75] Inventor: Akihiko Shiraishi, Kawasaki, Japan

[73] Assignee: Canon Kabushiki Kaisha, Tokyo, Japan

[21] Appl. No.: 164,771

[22] Filed: Dec. 10, 1993

Related U.S. Application Data

[63] Continuation of Ser. No. 735,800, Jul. 25, 1991, abandoned.

[30] Foreign Application Priority Data

Jul. 26, 1990 [JP] Japan ................... 2-199479

[51] Int. Cl.$^6$ ........................... H04N 9/083
[52] U.S. Cl. ................... 348/291; 348/342; 359/569; 359/571; 359/572
[58] Field of Search ................... 348/237, 266, 348/290, 291, 292, 340, 342; 359/571, 885, 569, 568, 563, 566; 358/331; H04N 9/04, 9/07, 9/09

[56] References Cited

U.S. PATENT DOCUMENTS

| | | | |
|---|---|---|---|
| 3,821,795 | 6/1974 | Okano | 358/47 |
| 3,940,788 | 2/1976 | Abe et al. | 358/55 |
| 4,178,611 | 12/1979 | Okano | 358/44 |
| 4,318,123 | 3/1982 | Knop | 358/44 |
| 4,878,737 | 11/1989 | Ise | 358/44 |
| 4,998,800 | 3/1991 | Nishida et al. | 358/47 |
| 4,998,801 | 3/1991 | Shirashi et al. | 358/331 |

FOREIGN PATENT DOCUMENTS 63-307423  12/1988  Japan ............... H04N 9/07

*Primary Examiner*—James J. Groody
*Assistant Examiner*—Michael H. Lee
*Attorney, Agent, or Firm*—Fitzpatrick, Cella, Harper & Scinto

[57] ABSTRACT

In a color image pickup apparatus having an objective lens or a member for removably mounting the objective lens, an image pickup device for converting the image of an object formed by the objective lens into a color electrical signal, and an optical low-pass filter comprising a diffraction grating and disposed between the rear end of the objective lens and the image pickup device, the optical low-pass filter satisfies the condition.

$$0.7 f_C \leq 1/d \leq f_Y - 0.7 f_C,$$

where d is the pitch of the diffraction grating, $f_Y$ is the spatial frequency for making the luminance signal of the image pickup means into a specimen, and $f_C$ is the spatial frequency for making the color signal of the image pickup means into a specimen.

15 Claims, 5 Drawing Sheets

COLOR IMAGE PICKUP APPARATUS PROVIDED WITH A DIFFRACTION TYPE LOW-PASS FILTER

This application is a continuation of application Ser. No. 07/735,800 filed Jul. 25, 1991, which is now abandoned.

BACKGROUND OF THE INVENTION

1. Field of the Invention

This invention relates to a color image pickup apparatus having an optical low-pass filter, and particularly to a color image pickup apparatus having an optical low-pass filter suitable for obtaining images discretely by the use of a solid state image pickup element in a video camera, an electronic still camera or the like.

2. Related Background Art

Generally, in a video camera or the like using a solid state image pickup element having a discrete picture element structure, image information is optically space-sampled to thereby obtain an output image.

If in this case, high spatial frequency components higher than a sampling frequency are included in an object, there will be produced many false color signals of structure or color which the object does not have. That is, frequency components which cannot be picked up by a photographing apparatus (frequency components exceeding the Nyquist frequency) cannot be reproduced as image information and can cause so-called waveform distortion, moiré fringes, false colors, etc. to be formed.

For this reason, heretofore, an optical low-pass filter has been disposed in a portion of a photo-taking system to limit the high spatial frequency components of an object. The optical low-pass filter used is often one utilizing the double refraction of a rock crystal plate or the like.

Figure 4:
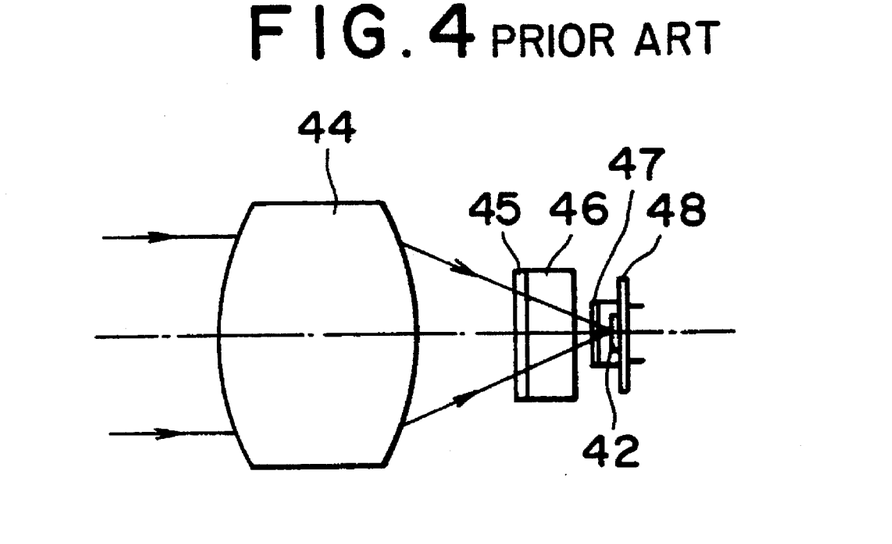
FIGS. 4 and 5 are optical cross-sectional views of examples of the prior art.

FIG. 4 of the accompanying drawings is an illustration of an optical system in which a conventional optical low-pass filter using a rock crystal plate and utilizing double refraction is provided in a portion of a photo-taking system.

In FIG. 4, the reference numeral 44 designates an image pickup lens, and the reference numeral 48 denotes an image pickup device having a light receiving portion 42 comprising a CCD or the like with a color filter array and cover glass 47. The reference numeral 45 designates an infrared light cut filter, and the reference numeral 46 denotes an optical low-pass filter comprising a rock crystal plate and formed integrally with the infrared light cut filter 45. The optical low-pass filter 46 separates an incident light beam into two ordinary and extraordinary light beams to thereby provide a low-pass effect.

Generally, the rock crystal plate has suffered from the problems that it is expensive and that to separate the incident light beam by a predetermined quantity, the rock crystal plate must be made thick to a certain degree.

So, an optical low-pass filter using a diffraction grating which is inexpensive and abounds in mass production, in place of the double refraction plate, has been proposed.

Figure 5:
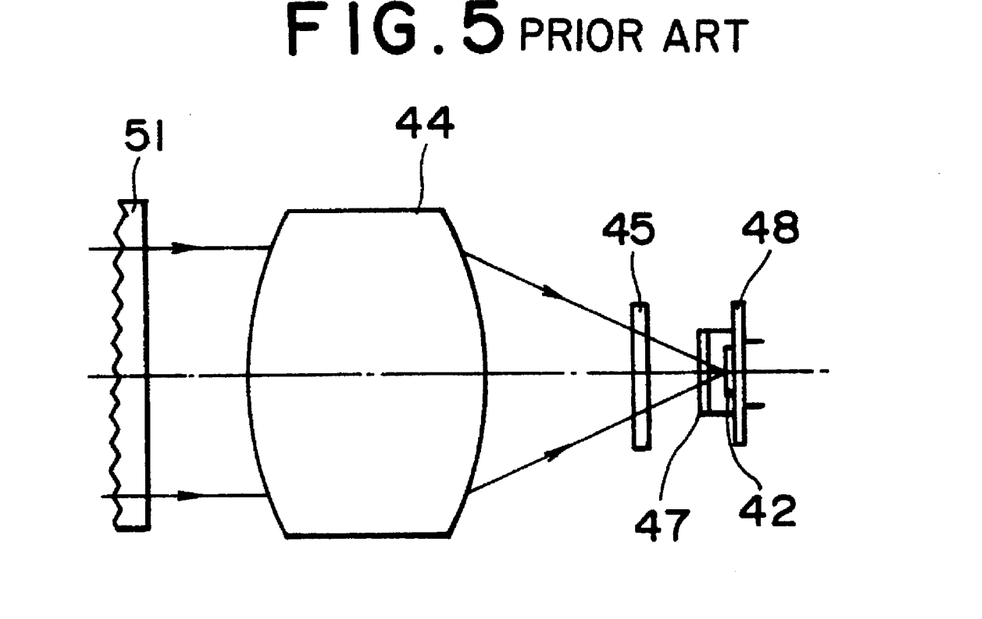

This optical low-pass filter, as is generally shown by 51 in FIG. 5 of the accompanying drawings, uses a lens system 44 interposed between the optical low-pass filter 51 and the image pickup device 48 in or forward of a photo-taking lens system and therefore, the entire device has tended to become complicated in mechanism and optical construction. Further, since this optical low-pass filter may be integrally disposed in the lens, it has been very difficult to systematize the image pickup apparatus so that various interchangeable lenses can be used.

Therefore, it is a conceivable method to integrally form an optical low-pass filter rearwardly of a photo-taking lens, particularly on the cover glass of an image pickup device, as shown in Japanese Laid-Open Patent Application No. 307423/63.

However, if an optical low-pass filter is disposed between a photo-taking lens and an image pick-up device, there has been the problem that although the low-band filter characteristic is satisfied, the depth of field increases to cause the image of a diffraction grating to be created on the picture plane when the aperture of the photo-taking lens is stopped down.

Figure 6:
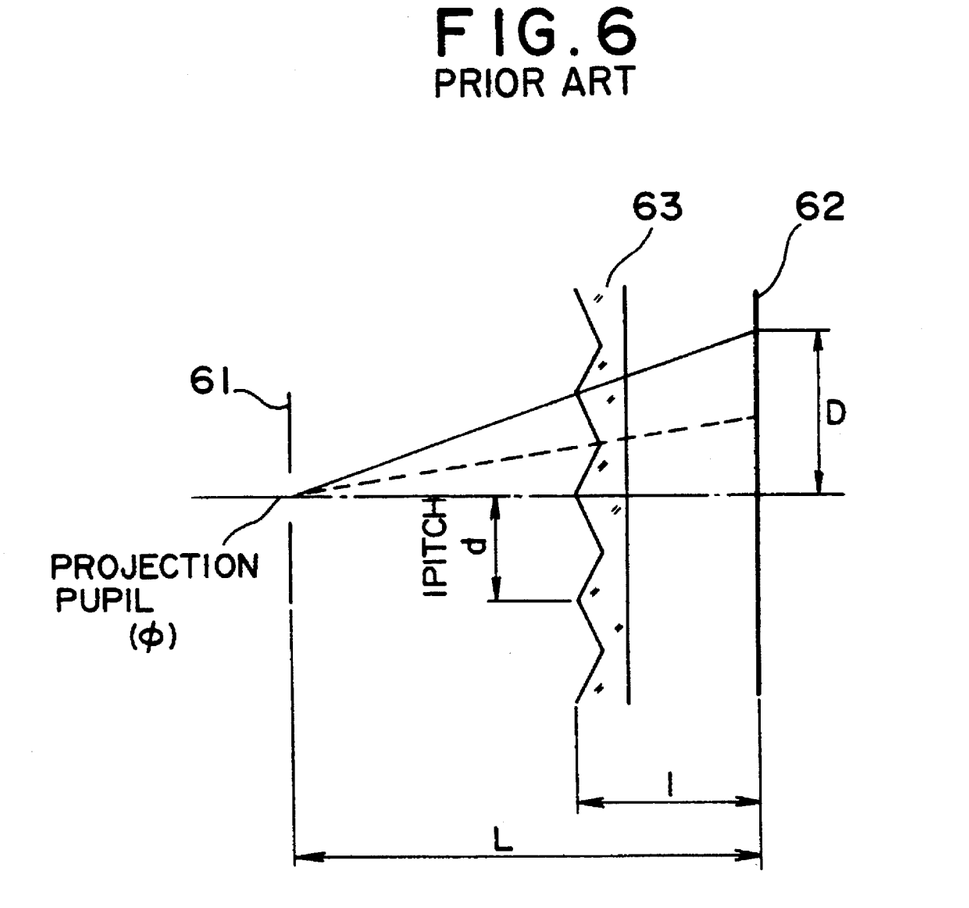
FIG. 6 is a view for illustrating a phenomenon caused by an optical low-pass filter.

That state is shown in FIG. 6 of the accompanying drawings. Let it be assumed that a light beam which has left a projection pupil 61 is stopped down. Assuming that this light beam is transmitted through an optical low-pass filter 63 and enters the image plane 62, the picked-up image of the optical low-pass filter is projected onto the image plane without being blurred on the image plane. When 10 at this time, the pitch of the diffraction grating is d and the projection pupil distance is L and the distance between the filter and the image plane is l, the pitch D of the projected image of the optical low-pass filter is $$D = d \cdot \frac{L}{L-l} \quad (1)$$

The optical low-pass filter has its transmittance varied periodically and therefore, this projected image becomes a light and dark striped pattern having periodic structure of pitch D in the same direction as the optical low-pass filter, and appears in the photographed image.

To eliminate this pattern, it is conceivable that a burden is applied to a signal processing circuit or there is a great limitation in the structure of the diffraction grating or the mounting thereof.

As related art, there is U.S. application Ser. No. 539,175.

SUMMARY OF THE INVENTION

The present invention has as its object the provision of a color image pickup apparatus in which the creation of a light and dark stripe pattern is suppressed and nevertheless, an optical low-pass filter can be disposed adjacent to an image pickup device and which has an inexpensive and compact optical low-pass filter.

A color image pickup apparatus having an optical low-pass filter according to the present invention has an image pickup element for converting the image of an object formed by an objective lens into a color electrical signal, the optical low-pass filter comprising a diffraction grating and being disposed between said objective lens and said image pickup element, and satisfies the following condition:

$$0.7 f_C \leq \frac{1}{d} \leq f_Y - 0.7 f_C,$$

where d is the pitch of the diffraction grating forming said optical low-pass filter, $f_Y$ is the spatial frequency for making the luminance signal of said image pickup element into a specimen, and $f_C$ is the spatial frequency for making the color signal of said image pickup element into a specimen.

In the present invention, the objective lens may be secured to the device body or may be removably mounted on the device body through a conventional mount or the like.

DESCRIPTION OF THE PREFERRED EMBODIMENTS

Figure 1:
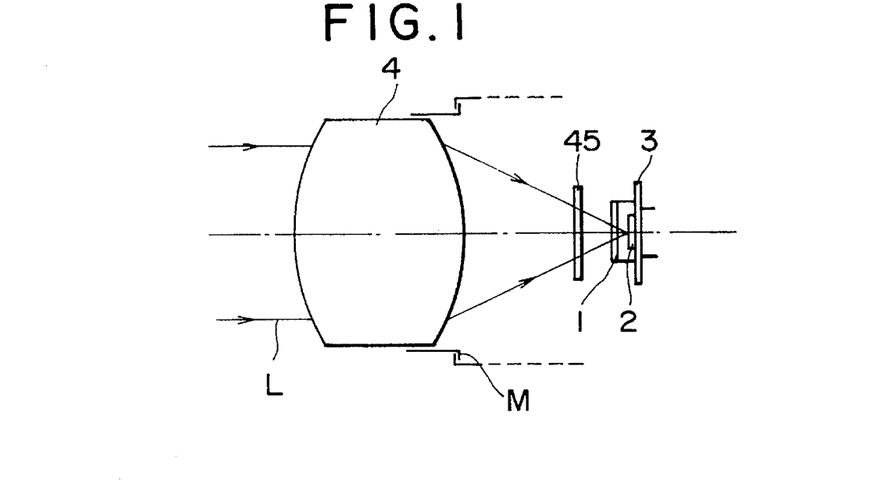
FIG. 1 is an optical cross-sectional view of an embodiment of the present invention.

FIG. 1 shows an embodiment in which an image pickup device having the optical low-pass effect according to the present invention is provided in a portion of an image pickup apparatus. In FIG. 1, the casing of the apparatus is omitted.

In the figure, the reference numeral 4 designates a photo-taking lens, and the reference numeral 3 denotes an image pickup element having the optical low-pass effect and having an optical low-pass filter 1 comprising a phase type diffraction grating which is a low-pass member having the low-pass effect and a light receiving portion 2 such as a CCD with a color filter. In the present embodiment, the optical low-pass filter 1 and the light receiving portion 2 are constructed integrally with each other. Also, where the photo-taking lens 4 is made removably mountable on a camera body, not shown, a mount M is interposed between the two.

Figure 2:
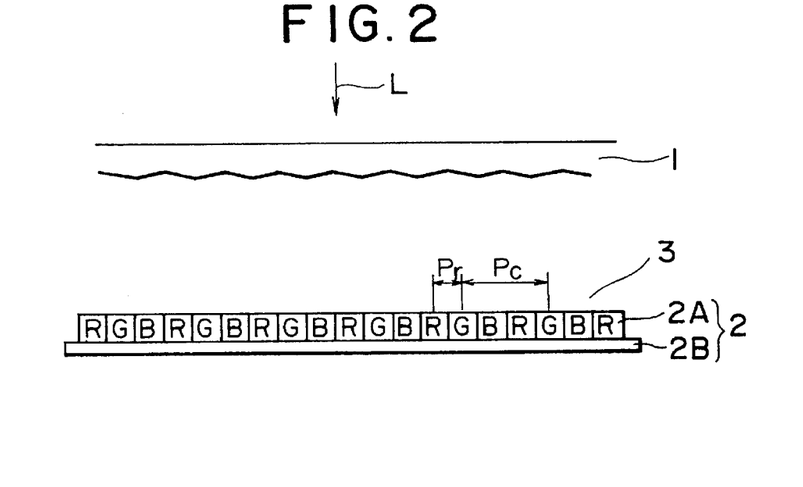
FIG. 2 is an enlarged view of the essential portion of the FIG. 1 embodiment.

FIG. 2 is an enlarged illustration of the essential portion of the image pickup element 3 of FIG. 1. The optical low-pass filter 1 is of a structure in which a plurality of minute triangular prisms are regularly disposed on one surface thereof.

Figure 3A:
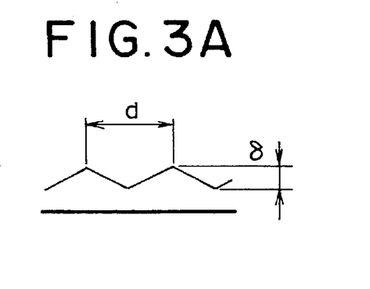
FIGS. 3A and 3B are cross-sectional views of an optical low-pass filter.
Figure 3B:
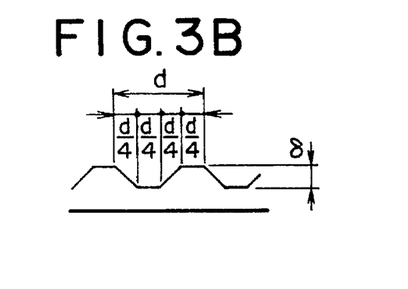

The cross-sectional shape of the optical low-pass filter is not restricted to the triangular wave shape shown in FIG. 3A, but may also be the trapezoidal wave shape shown in FIG. 3B or may be any other shape such as a rectangular wave shape or a sine wave shape which acts as a diffraction grating.

Also, the filter surface (diffraction grating structure) of the optical low-pass filter 1 may lie on the color filter portion 2 side as shown in FIG. 2, or may lie on the photo-taking lens 4 side. Where as in the present embodiment, the optical low-pass filter 1 is constructed integrally with the image pickup device, it is more preferable that the filter surface be constructed in face-to-face relationship with the solid state image pickup element 3 because that makes it difficult for dust or flaws to be present on the filter surface.

When the optical low-pass filter 1 is thus brought close to the filter portion of the image pickup element, the air-converted distance a between the optical low-pass filter and the image plane (the photosensitive surface of the image pickup element) can be sufficiently small as compared with the distance L to the projection pupil and therefore, equation (1) becomes $$D \approx d \tag{1'}$$

That is, the pitch D of a striped pattern formed when the optical low-pass filter is projected onto the image plane becomes substantially equal to the grating pitch d of the optical low-pass filter.

Figure 7:
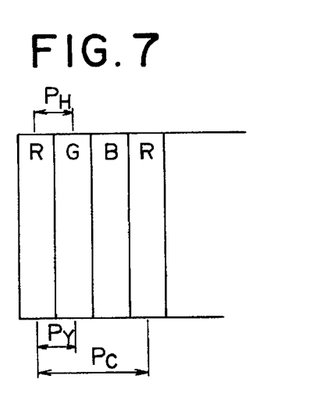
FIGS. 7, 9 and 11 show the constructions of image pickup devices.

In the present embodiment, it is to be understood that the image pickup element is comprised of the arrangement of a plurality of color filter elements R, G and B arranged in a striped pattern at a pitch of $p_H$ in the horizontal direction as shown in FIG. 7. R represents red color filter elements, G represents green color filter elements, and B represents blue color filter elements. It is to be understood that as shown in FIG. 2, the color filter portion is constructed so that a light receiving element array 2B forming each picture element may be at a position corresponding to each color filter element array 2A. The spacing $p_Y$ for making the luminance signal of this image pickup element into a specimen and the spacing $p_C$ for making the color signal of this image pickup element into a specimen are as follows:

$$p_Y = p_H$$

$$p_C = 3p_H \tag{2}$$

From this, the frequency $f_Y$ for making the luminance signal into a specimen and the frequency $f_C$ for making the color signal into a specimen are as follows:

$$f_Y = 1/p_Y = 1/p_H$$

$$f_C = 1/p_C = \frac{1}{3}p_H \tag{3}$$

Figure 8:
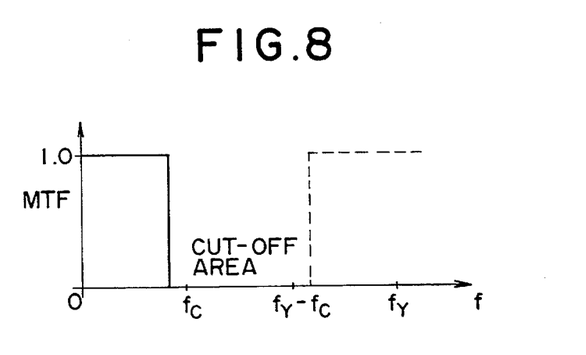
FIGS. 8, 10 and 12 show frequency characteristics.

The luminance signal picked up from this image pickup element is subjected to signal processing having the MTF characteristic indicated by a solid line in FIG. 8. That is, the luminance signal has a pass band to a little short of the frequency $f_C$, and any greater frequency components are cut off. The frequency of the pass band is usually set to a value of at least 70% of $f_C$. In FIG. 8, the broken line indicates a modulation component turned back from the frequency $f_Y$ for making the luminance signal into a specimen.

Here, when expression (1') is used, if the frequency $f_D$ of the striped pattern of the optical low-pass filter, i.e., $$f_D = 1/D \approx 1/d \tag{4}$$

is in the cut-off area shown in FIG. 8, the striped pattern of the optical low-pass filter will not appear in an output image obtained through the signal processing. The condition for this is $$0.7f_C \leq \frac{1}{d} \leq f_Y - 0.7f_C, \tag{5}$$

If the lower limit of inequality (5) is exceeded, the striped pattern of the optical low-pass filter will come into the pass band of the signal processing system and the striped pattern will appear in the output image, and if the upper limit of inequality (5) is exceeded, the turn-back from the modulation component which is at the frequency $f_Y$ will come into the pass band of the signal processing system and the striped pattern will also appear in the output image, and in any case, the resultant image will become an undesirable image.

It is hereinafter to be understood that with conveniences in actual designing taken into account, as a more specific example, diffraction gratings of triangular wave and trapezoidal wave shown in FIGS. 3A and 3B are used in the optical low-pass filter. The transmission function at this time is as follows. In the following, the suffix tri. shows the diffraction grating of triangular wave shape, and the suffix tra. shows the diffraction grating of trapezoidal wave shape.

$$H \, tri.(f) = \{1 - (f/fc)\}\cos(\pi\gamma f/fc) + \sin(\pi\gamma f/fc)/(\pi\gamma) \quad (0 \leq f < fc) \tag{6}$$

$$H \, tra.(f) = \begin{cases} \{1/2 - (f/fc)\}\{\cos(2\pi\gamma f/fc) + 1 + \sin(2\pi\gamma f/fc)/(\pi\gamma) \\ (0 \leq f < fc/2) \\ \{(f/fc) - 1/2\}\cos\pi\gamma - \\ [\sin\{\sin 2\pi\gamma(f/fc) - 1/2\}] - \\ 2\sin(\pi\gamma)]/(2\pi\gamma) \\ (fc/2 \leq f < fc) \end{cases} \tag{7}$$

where $fc = \frac{d}{2\lambda l}$, $\gamma = 2(n-1)\delta/\lambda$, d: pitch of the diffraction grating, $\delta$: height of the unevenness of the diffraction grating, n: refractive index of the convex portion, l: air-converted distance between the diffraction grating and the image plane, $\lambda$: wavelength.

Further, there are the relations that $$H \, tri.(-f) = H \, tri.(f), \, H \, tri.(f+2f_C) = H \, tri.(f) \tag{8}$$

$$H \, tra.(-f) = H \, tra.(f), \, H \, tra.(f+2f_C) = H \, tra.(f). \tag{9}$$

Figure 13A:
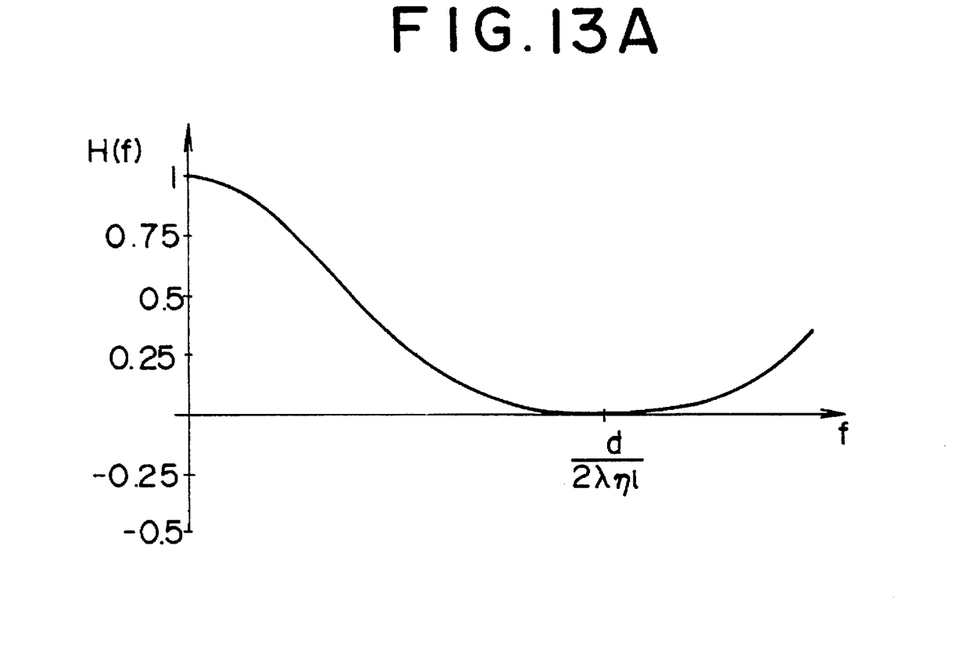
FIGS. 13A and 13B are graphs concerned with transmission function of the optical low-pass filter.
Figure 13B:
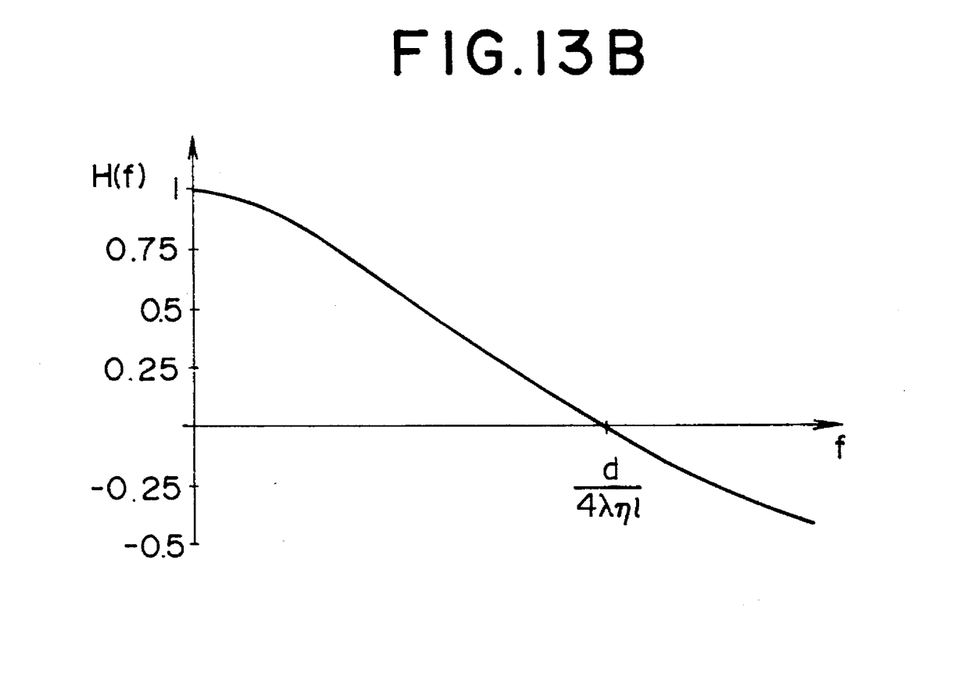

Assuming here that
ti $\lambda_D = 2(n-1)\delta$, (10)
the phase difference between the lights transmitted through the concave and convex portions of the diffraction grating when $\lambda = \lambda_D$ is ½ wavelength. The value of $\lambda_D$ is generally the substantially central wavelength of the visible range, and the height $\delta$ of the unevenness of the diffraction grating is determined so that such a value of $\lambda_D$ may be obtained. Here, the value of $\lambda_D$ is 550 nm which is the peak wavelength of the transmittance of the green optical filter G shown in FIG. 7. Luminosity becomes highest in the vicinity of this wavelength $\lambda_D$ and therefore, the transmission function of the optical low-pass filter having this wavelength $\lambda_D$ affects the quality of the image most dominantly. The transmission functions of (a) triangular wave and (b) trapezoidal wave when $\lambda = \lambda_D$ are shown in FIG. 13. From expressions (6), (7) and (10) and $\lambda = \lambda_D$, the frequencies for which the transmission functions are 0 are as follows:

$$f_0 tri. = \frac{d}{2\lambda_D l} \tag{11}$$

$$f_0 tra. = \frac{d}{4\lambda_D l} \tag{12}$$

so $$f_C = f_0 tri. \, \text{or} \, f_0 tra. \tag{13}$$

If this is done, the modulation frequency of the color signal closest to the base band can be on-trapped and therefore, the influence of turn-back distortion can be suppressed and a good image can be obtained.

From these conditions, an attempt is made to find a condition under which there is no turn-back distortion between the triangular wave and the trapezoidal wave and moreover the image of the optical low-pass filter does not appear as a striped pattern in the output image.

In the case of an optical low-pass filter of triangular wave, the following inequality is obtained from expressions (3), (5), (11) and (13):

$$1.96 \frac{p_H^2}{\lambda_D} \leq l \leq 6.43 \frac{p_H^2}{\lambda_D} \tag{14}$$

That is, the distance l between the optical low-pass filter and the image plane can be found so as to satisfy expression (14).

Further, from expressions (3), (10) and (13), $$d = \frac{2\lambda_D l}{3 p_H} \tag{15}$$

and therefore, the pitch d of the diffraction grating is found. The height $\delta$ of the unevenness of the diffraction grating is found from expression (10) by $X_D = 550$ nm and thereby, the shape and location of the optical low-pass filter can be determined.

Likewise, in the case of an optical low-pass filter of trapezoidal wave, from expressions (3), (5), (12) and (13), the condition which should be satisfied by the distance l between the optical low-pass filter and the image plane is $$0.98 \frac{p_H^2}{\lambda_D} \leq l \leq 3.22 \frac{p_H}{\lambda_D} \tag{16}$$

and the pitch d of the diffraction grating is determined as follows:

$$d = \frac{2\lambda_D l}{3 p_H} \tag{17}$$

Figure 9:
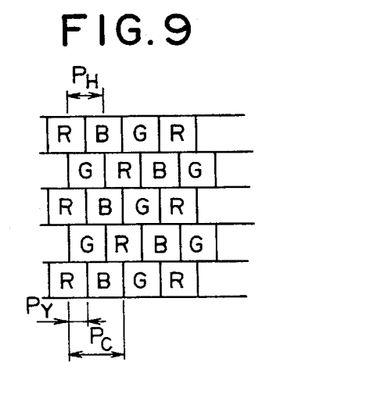
Figure 10:
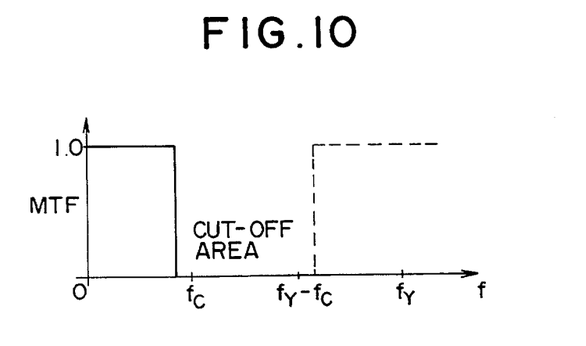

The case of a color image pickup device in which filters R, G and B are mounted on an image pickup element having offset sampling structure as shown in FIG. 9 will now be taken up as a second embodiment of the present invention. In this case, the spatial frequency component in the horizontal direction can be obtained up to a spatial frequency double that of an image pickup element of stripe-shaped structure as shown in FIG. 7. That is, the spacing $p_Y$ for making the luminance signal of the image pickup element in the present embodiment into a specimen and the spacing $p_C$ for making the color signal into a specimen are as follows:

$$p_Y = p_H/2$$

$$p_C = 3 p_H/2 \tag{18}$$

Thus, the frequency $f_Y$ for making the luminance signal into a specimen and the frequency $f_C$ for making the color signal into a specimen are as follows:

$$f_Y = 1/p_Y = 2/p_H$$

$$f_C = 1/p_C = \tfrac{2}{3} p_H \tag{19}$$

If here, as in the first embodiment, $\lambda_D = 550$ nm and the function for which the transmission function of the optical low-pass filter is 0 at set as shown by expression (13), the condition center which the image of the optical low-pass filter does not appear as a striped pattern in the output image is as follows.

In the case of an optical low-pass filter of triangular wave, from expressions (19), (5), (11) and (13), the condition which should be satisfied by the distance l between the optical low-pass filter and the image plane is $$0.98 \frac{p_H^2}{\lambda_D} \leq l \leq 3.22 \frac{p_H^2}{\lambda_D} \quad (20)$$

and the pitch of the diffraction grating is as follows:

$$d = \frac{4\lambda_D l}{3 p_H} \quad (21)$$

In the case of an optical low-pass filter of trapezoidal wave, from expressions (19), (5), (12) and (13), the condition which should be satisfied by the distance l between the optical low-pass filter and the image plane is $$0.49 \frac{p_H^2}{\lambda_D} \leq l \leq 1.61 \frac{p_H^2}{\lambda_D} \quad (22)$$

and the pitch of the diffraction grating is as follows:

$$d = \frac{8\lambda_D l}{3 p_H} \quad (23)$$

Figure 11:
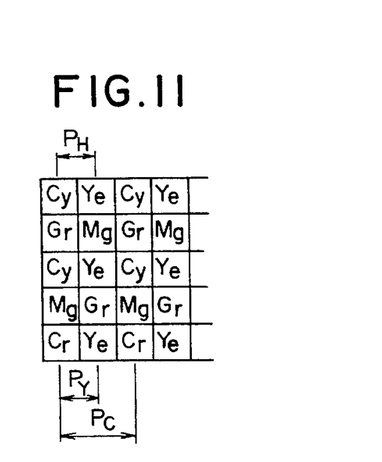
Figure 12:
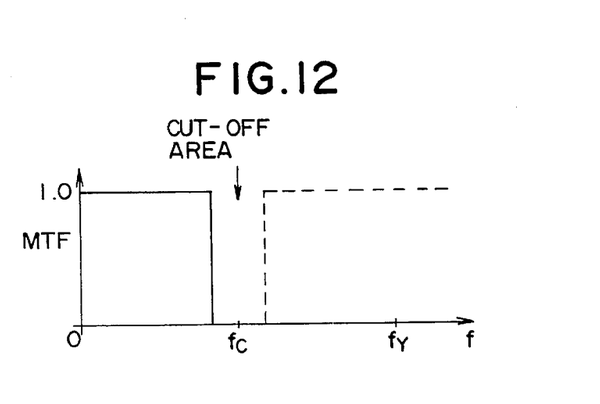

As a third embodiment of the present invention, description will now be given of the case of a color image pickup element in which magenta, green, cyan and yellow filters Mg, Gr, Cy and Ye as shown in FIG. 11 are arranged in a mosaic fashion as shown and light receiving elements are disposed at locations corresponding to the respective color filters. At this time, the spacing for making the luminance signal into a specimen is the same as that in the first embodiment of the present invention, while the spacing for making the color signal into a specimen is one period for two picture elements. That is, $p_Y = p_H$ $p_C = 2 p_H \quad (24)$ Thus, the frequency $f_Y$ for making the luminance signal into a specimen and the frequency $f_C$ for making the color signal are as follows:

$f_Y = 1/p_Y = 1/p_H$ $f_C = 1/p_C = \frac{1}{2} p_H \quad (25)$

If here, as in the first embodiment, $\lambda_D = 550$ nm and the frequency for which the transmission function of the optical low-pass filter is 0 is set as shown by expression (13), the condition under which the image of the optical low-pass filter does not appear as a stripped pattern in the output image is as follows.

In the case of an optical low-pass filter of triangular wave, from expressions (25), (5), (11) and (13), the condition which should be satisfied by the distance l between the optical low-pass filter and the image plane is $$1.54 \frac{p_H^2}{\lambda_D} \leq l \leq 2.86 \frac{p_H^2}{\lambda_D} \quad (26)$$

and the pitch of the diffraction grating is as follows:

$$d = \frac{\lambda_D l}{p_H} \quad (27)$$

In the case of an optical low-pass filter of trapezoidal wave, from expressions (25), (5), (12) and (13), the condition which should be satisfied by the distance l between the optical low-pass filter and the image plane is $$0.77 \frac{p_H^2}{\lambda_D} \leq l \leq 1.43 \frac{p_H^2}{\lambda_D} \quad (28)$$

and the pitch of the diffraction grating is as follows:

$$d = \frac{2\lambda_D l}{p_H} \quad (29)$$

In the present invention, the optical low-pass filter may be constructed integrally with the image pickup device as shown in FIG. 1, and may be disposed at any location between the photo-taking lens and the image pickup device if it satisfies the conditions (14), (16), (20), (22), (26) and (28). Further, where the optical low-pass filter is constructed integrally with the image pickup device, the diffraction grating structure may be formed on the cover glass, or may be adhered to the front of the color filter together with what is resin-molded. Furthermore, in an image pickup element subjected to plastic molding on the light receiving surface thereof, unevenness may be formed on the molded surface thereof to thereby constitute an optical low-pass filter, or a medium whose refractive index varies may be poured into the interior of plastic to thereby construct such an optical low-pass filter that the refractive index distribution thereof forms a grating structure.

The wavelengths of the picture elements of the image pickup device and the wavelengths of the elements of the color filters need not coincide with each other.

According to the present invention, there can be provided a color image pickup apparatus having an optical low-pass filter in which even if the optical low-pass filter which is a diffraction grating is placed between an objective lens and an image pickup device, the image of the optical low-pass filter will not appear in an output image and moreover turn-back distortion can be suppressed well, and which is inexpensive and compact and can cope with an interchangeable lens.

Further, if the optical low-pass filter is constructed integrally with the image pickup device, there can be achieved a color image pickup apparatus having the optical low-pass effect in which the adjustment of the spacing between the optical low-pass filter and a light receiving portion and the adjustment of the direction of arrangement of color filters and the direction of arrangement of the optical low-pass filter, i.e., the direction of diffraction, are unnecessary and which is easy to assemble and adjust and is improved in operability.

Furthermore, if evaporated film for cutting infrared light is provided on one surface of the low-pass member, it will become unnecessary to further provide an infrared light cut filter and it will become possible to achieve simplification of the entire optical system.

What is claimed is:

1. A color image pickup apparatus comprising:

an objective lens or a member for removably mounting the objective lens;

image pickup means for converting the image of an object formed by said objective lens into a color electrical signal; and an optical low-pass filter comprising a diffraction grating and disposed between a rear end of said objective lens and said image pickup means, said optical low-pass filter satisfying the condition $0.7 f_C \leq 1/d \leq f_Y - 0.7 f_C$, where d is the pitch of the diffraction grating, $f_Y$ is a spatial frequency for making a luminance signal of said image pickup means into a specimen, and $f_C$ is a spatial frequency for making the color signal of said image pickup means into a specimen.

2. A color image pickup apparatus according to claim 1, wherein said image pickup means is provided with a stripe-like-color filter and a solid state image pickup element.

3. A color image pickup apparatus according to claim 1, wherein said image pickup means is provided with a solid state image pickup element having offset sampling structure and a color filter corresponding thereto.

4. A color image pickup apparatus according to claim 1, wherein said image pickup means is provided with a mosaic-like color filter and a solid state image pickup element.

5. A color image pickup apparatus according to claim 1, wherein said image pickup means is provided with a color filter and a solid state image pickup element, and wavelengths of the elements of the color filter and wavelengths of the picture elements of the solid state image pickup element are incoincident with each other.

6. A color image pickup apparatus comprising:

an objective lens or a member for removably mounting the objective lens;

image pickup means for converting the image of an object formed by said objective lens into a color electrical signal; and an optical low-pass filter comprising a diffraction grating and disposed between a rear end of said objective lens and said image pickup means, said optical low-pass filter satisfying the condition $$0.7 f_C \leq 1/d \leq f_Y - 0.7 f_C,$$

where d is the pitch of the diffraction grating, $f_Y$ is a spatial frequency for making a luminance signal of said image pickup means into a specimen, and $f_C$ is a spatial frequency for making the color signal of said image pickup means into a specimen, wherein said diffraction grating is of a triangular wave-like cross-sectional shape, and wherein the pitch d of said diffraction grating satisfies the conditions $$d = \frac{2\lambda_D l}{3 p_H}$$

$$1.96 \frac{p_H^2}{\lambda_D} \leq l \leq 6.43 \frac{p_H^2}{\lambda_D},$$

where l is an air-converted distance from the diffraction grating to the photosensitive surface of said image pickup means, $p_H$ is a picture element pitch of said image pickup means, and $\lambda_D$ is a design wavelength.

7. A color image pickup apparatus comprising:

an objective lens or a member for removably mounting the objective lens;

image pickup means for converting the image of an object formed by said objective lens into a color electrical signal; and an optical low-pass filter comprising a diffraction grating and disposed between a rear end of said objective lens and said image pickup means, said optical low-pass filter satisfying the condition $$0.7 f_C \leq 1/d \leq f_Y - 0.7 f_C,$$

where d is the pitch of the diffraction grating, $f_Y$ is a spatial frequency for making a luminance signal of said image pickup means into a specimen, and $f_C$ is a spatial frequency for making the color signal of said image pickup means into a specimen, wherein said diffraction grating is of a trapezoidal wave-like cross-sectional shape, and wherein the pitch d of said diffraction grating satisfies the conditions $$d = \frac{4\lambda_D l}{3 p_H}$$

$$0.98 \frac{p_H^2}{\lambda_D} \leq l \leq 3.22 \frac{p_H^2}{\lambda_D},$$

where l is an air-converted distance from the diffraction grating to the photosensitive surface of said image pickup means, $p_H$ is a picture element pitch of said image pickup means, and $\lambda$ is a design wavelength.

8. A color image pickup apparatus, comprising:

an objective lens or a member for removably mounting the objective lens;

image pickup means for converting the image of an object formed by said objective lens into a color electrical signal; and an optical low-pass filter comprising a diffraction grating and disposed between a rear end of said objective lens and said image pickup means, said optical low-pass filter satisfying the condition $$0.7 f_C \leq 1/d \leq f_Y - 0.7 f_C,$$

where d is the pitch of the diffraction grating, $f_Y$ is a spatial frequency for making a luminance signal of said image pickup means into a specimen, and $f_C$ is a spatial frequency for making the color signal of said image pickup means into a specimen, wherein said image pickup means is provided with a solid state image pickup element having offset sampling structure and a color filter corresponding thereto, and wherein said diffraction grating is of a triangular wave-like cross-sectional shape, and wherein the pitch d of said diffraction grating satisfies the conditions $$d = \frac{4\lambda_D l}{3 p_H}$$

$$0.98 \frac{p_H^2}{\lambda_D} \leq l \leq 3.22 \frac{p_H^2}{\lambda_D},$$

where l is an air-converted distance from the diffraction grating to the photosensitive surface of said image pickup means, $p_H$ is a picture element pitch of said image pickup means, and $\lambda_D$ is a design wavelength.

9. A color image pickup apparatus, comprising:

an objective lens or a member for removably mounting the objective lens;

image pickup means for converting the image of an object formed by said objective lens into a color electrical signal; and an optical low-pass filter comprising a diffraction grating and disposed between a rear end of said objective lens and said image pickup means, said optical low-pass filter satisfying the condition $$0.7 f_C 1/d \leq f_Y - 0.7 f_C,$$

where d is the pitch of the diffraction grating, $f_Y$ is a spatial frequency for making a luminance signal of said image pickup means into a specimen, and $f_C$ is a spatial frequency for making the color signal of said image pickup means into a specimen, wherein said image pickup means is provided with a solid state image pickup element having offset sampling structure and a color filter corresponding thereto, and wherein said diffraction grating is of a trapezoidal wave-like cross-sectional shape, and wherein the pitch d of said diffraction grating satisfies the conditions $$d = \frac{8\lambda_D l}{3p_H}$$

$$0.49 \frac{p_H^2}{\lambda_D} \leq l \leq 1.61 \frac{p_H^2}{\lambda_D},$$

where l is an air-converted distance from the diffraction grating to the photosensitive surface of said image pickup means, $p_H$ is a picture element pitch of said image pickup means, and $\lambda_D$ is a design wavelength.

10. A color image pickup apparatus, comprising:

an objective lens or a member for removably mounting the objective lens;

image pickup means for converting the image of an object formed by said objective lens into a color electrical signal; and an optical low-pass filter comprising a diffraction grating and disposed between a rear end of said objective lens and said image pickup means, said optical low-pass filter satisfying the condition $$0.7 f_Y \leq 1/d \leq f_C - 0.7 f_C,$$

where d is the pitch of the diffraction grating, $f_Y$ is a spatial frequency for making a luminance signal of said image pickup means into a specimen, and $f_C$ is a spatial frequency for making the color signal of said image pickup means into a specimen, wherein said image pickup means is provided with a mosaic-like color filter and a solid state image pickup element, and wherein said diffraction grating is of a triangular wave-like cross-sectional shape, and wherein the pitch d of said diffraction grating satisfies the conditions $$d = \frac{\lambda_D l}{p_H}$$

$$1.54 \frac{p_H^2}{\lambda_D} \leq l \leq 2.86 \frac{p_H^2}{\lambda_D},$$

where l is an air-converted distance from the diffraction grating to the photosensitive surface of said image pickup means, $p_H$ is a picture element pitch of said image pickup means, and $\lambda_D$ is a design wavelength.

11. A color image pickup apparatus, comprising:

an objective lens or a member for removably mounting the objective lens;

image pickup means for converting the image of an object formed by said objective lens into a color electrical signal; and an optical low-pass filter comprising a diffraction grating and disposed between a rear end of said objective lens and said image pickup means, said optical low-pass filter satisfying the condition $$0.7 f_C \leq 1/d \leq f_Y - 0.7 f_C,$$

where d is the pitch of the diffraction grating, $f_Y$ is a spatial frequency for making a luminance signal of said image pickup means into a specimen, and $f_C$ is a spatial frequency for making the color signal of said image pickup means into a specimen, wherein said image pickup means is provided with a mosaic-like color filter and a solid state image pickup element, and wherein said diffraction grating is of a trapezoidal wave-like cross-sectional shape, and wherein the pitch d of said diffraction grating satisfies the conditions $$d = \frac{2\lambda_D l}{p_H}$$

$$0.77 \frac{p_H^2}{\lambda_D} \leq l \leq 1.43 \frac{p_H^2}{\lambda_D},$$

where l is an air-converted distance from the diffraction grating to the photosensitive surface of said image pickup means, $p_H$ is a picture element pitch of said image pickup means, and $\lambda_D$ is a design wavelength.

12. A color image pickup apparatus comprising:

an objective lens having a stop including a changeable aperture or a member for removably mounting the objective lens;

image pickup means for converting the image of an object formed by said objective lens into a color electrical signal; and an optical low-pass filter comprising a diffraction grating and disposed between a rear end of said objective lens and said image pickup means, said optical low-pass filter satisfying the condition $$0.7 f_C \leq 1/l \leq f_Y - 0.7 f_C,$$

where d is the pitch of the diffraction grating, $f_Y$ is a spatial frequency for making a luminance signal of said image pickup means into a specimen, and $f_C$ is a spatial frequency for making the color signal of said image pickup means into a specimen, wherein said image pickup means has a pickup image in which a color filter consisting of an array of color filter elements mutually having different colors is provided in front of a light receiving portion and wherein said optical low-pass filter is arranged near said image pickup means rather than said objective lens or the member for removably mounting the objective lens.

13. An apparatus according to claim 12, wherein said optical low-pass filter is supported by said image pickup element.

14. An apparatus according to claim 12, wherein said optical low-pass filter is arranged between said image pickup element and an infrared ray cut filter.

15. An apparatus according to claim 12, wherein said light receiving portion includes a CCD.

* * * * *

UNITED STATES PATENT AND TRADEMARK OFFICE
CERTIFICATE OF CORRECTION

PATENT NO. : 5,461,418
DATED : October 24, 1995
INVENTOR(S) : AKIHIKO SHIRAISHI

It is certified that error appears in the above-indentified patent and that said Letters Patent is hereby corrected as shown below:

On the title page item [57],

Line 8, "condition." should read --condition--.

COLUMN 1

Line 6, "filled" should read --filed--.

COLUMN 2

Line 21, "10" should be deleted.

COLUMN 3

Line 61, "a" should read --1--.

COLUMN 5

Line 7 (Equation) "$\{1/2-(f/f_C)\}$ $\{\cos(2\pi\gamma f/f_C)+1+$" should read --$\{1/2-(f/f_C)\}\cos(2\pi\gamma f/f_C)+1+$-- and "$\{(f/f_C)-1/2\}\cos\pi\gamma)-$" should read --$\{(f/f_C)-1/2\}\cos(\pi\gamma)-$--;

Line 32, "ti" should be deleted.

COLUMN 6

Line 17, "$X_D = 550$ nm" should read --$\lambda_D = 550$ nm--.

COLUMN 9

Line 6, "like-color" should read --like color--.

UNITED STATES PATENT AND TRADEMARK OFFICE
CERTIFICATE OF CORRECTION

PATENT NO. : 5,461,418
DATED : October 24, 1995
INVENTOR(S) : AKIHIKO SHIRAISHI

It is certified that error appears in the above-indentified patent and that said Letters Patent is hereby corrected as shown below:

COLUMN 11

Line 34, "$0.7f_Y \leq 1/d \leq f_c - 0.7F_c,$" should read
--$0.7f_c \leq 1/d \leq f_Y - 0.7f_c,$--.

COLUMN 12

Line 41, "$0.7f_c \leq 1/ \leq f_Y - 0.7f_c,$" should read
--$0.7f_c \leq 1/d \leq f_Y - 0.7f_c,$--

Signed and Sealed this

Fifth Day of March, 1996

BRUCE LEHMAN

*Attest:*

*Attesting Officer*         *Commissioner of Patents and Trademarks*